(12) United States Patent
Poulsen et al.

(10) Patent No.: US 9,701,235 B2
(45) Date of Patent: Jul. 11, 2017

(54) METHOD OF MOUNTING A WIND TURBINE

(71) Applicants: Henning Poulsen, Skjern (DK); Kristian Soeholm, Vejle Øst (DK)

(72) Inventors: Henning Poulsen, Skjern (DK); Kristian Soeholm, Vejle Øst (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 364 days.

(21) Appl. No.: 14/107,151

(22) Filed: Dec. 16, 2013

(65) Prior Publication Data
US 2014/0173898 A1  Jun. 26, 2014

(30) Foreign Application Priority Data

Dec. 21, 2012 (EP) ..................... 12199060

(51) Int. Cl.
*B60P 1/04* (2006.01)
*F03D 13/10* (2016.01)
*F03D 13/40* (2016.01)

(52) U.S. Cl.
CPC ............... *B60P 1/04* (2013.01); *F03D 13/10* (2016.05); *F03D 13/40* (2016.05); *F05B 2240/14* (2013.01); *F05B 2240/941* (2013.01); *Y02E 10/728* (2013.01); *Y10T 29/4932* (2015.01)

(58) Field of Classification Search
CPC . B60P 1/04; F03D 1/001; F03D 1/005; Y02E 10/726; Y02E 10/728; Y10T 29/4932; F05B 2240/14; F05B 2240/941
See application file for complete search history.

(56) References Cited

U.S. PATENT DOCUMENTS

| | | | |
|---|---|---|---|
| 2001/0038207 A1 | 11/2001 | Hansen | |
| 2009/0159549 A1* | 6/2009 | Trede | B66C 1/108 212/270 |
| 2010/0143046 A1 | 6/2010 | Godejord | |
| 2013/0098859 A1* | 4/2013 | Soe | B66C 23/207 212/179 |

FOREIGN PATENT DOCUMENTS

| | | |
|---|---|---|
| EP | 1798104 A2 | 6/2007 |
| EP | 2481631 A1 | 8/2012 |

* cited by examiner

*Primary Examiner* — Moshe Wilensky

(57) ABSTRACT

An installation apparatus for handling a component of a wind turbine is provided. The installation apparatus includes a base, a support portion and an extensible arm having opposing ends connected to the support portion and the base, respectively. The extensible arm is adapted to move the support portion relative to the base and about a transverse axis of the installation apparatus between a transport position and an installation position. In the transport position the support portion rests on the base. In the installation position the support portion and the base form an angle. An assembly including such an installation apparatus and a method of mounting a wind turbine are also provided.

4 Claims, 6 Drawing Sheets

METHOD OF MOUNTING A WIND TURBINE

CROSS REFERENCE TO RELATED APPLICATIONS

The present application claims priority to European Patent Office application No. 12199060.0 EP filed Dec. 21, 2012, the entire content of which is hereby incorporated herein by reference.

FIELD OF INVENTION

The invention relates to an installation apparatus for handling wind turbine components during an installation, an assembly including such an installation apparatus, and a method of mounting a wind turbine.

BACKGROUND OF THE INVENTION

With the increasing size of current wind turbines, many of the components of the wind turbines have to be transported individually before being assembled. This is especially the case when bridges or tunnels on the route from the wind turbine factory to the destination restrict the size of the components to be transported. The assembly can take place at the site where the wind turbine is to be erected or at an intermediate place such as a harbour used for shipping the wind turbine components. At such an intermediate place some of the wind turbine components may be preassembled to larger wind turbine sections either before shipping to the destination harbour or to an off-shore wind park or after the individual wind turbine components have been landed at the destination harbour. During assembly one or more cranes are used for handling the large and heavy wind turbine components, especially for lifting and aligning the wind turbine components. However, such equipment is expensive and may not be available at some installation sites such as small harbours.

SUMMARY OF THE INVENTION

The invention therefore provides an installation apparatus for handling a first component of a wind turbine during an installation of the first component to a second component of the wind turbine. The first and second components usually are one of a nacelle, a generator or a hub. The installation apparatus comprises a base, a support portion and an extensible arm having opposing ends connected to the support portion and the base, respectively. The extensible arm is adapted to move the support portion relative to the base and about a transverse axis of the installation apparatus between a transport position and an installation position. In the transport position the support portion rests on the base. In the installation position the support portion and the base form an angle.

The invention provides simple and inexpensive means for handling the wind turbine components. The base of the installation apparatus may be placed on a cargo area of a truck. A wind turbine component may be placed on the support portion of the installation apparatus for transport and/or handling during mounting. The installation apparatus may be used to move the wind turbine component from a horizontal position to the position in which the wind turbine component on the installation apparatus will be mounted to another wind turbine. The wind turbine component will usually be connected to a frame for transportation. This frame may be fixed to the support portion of the installation apparatus for handling. When the installation apparatus is released from the wind turbine component after the wind turbine component has been mounted to another wind turbine component, the frame may be detached from the wind turbine component while still being connected to the installation apparatus. The frame and the installation apparatus can then be separated again kept for later usage.

The installation apparatus may be constructed from relatively simple components such as steel beems. The extensible arm can include a hydraulic cylinder which provides for great lifting force and precise movement. Other means such as electric actuators or purely mechanical gear may be used for the same purpose. The extensible arm may be controlled by a controller e.g. using a remote control technique.

If the installation apparatus is placed on the cargo area of a truck, the truck can be used to position the wind turbine component attached to the installation apparatus for positioning and aligning the wind turbine components. Thus, according to the invention no cranes or comparable means are required for assembling the wind turbine or wind turbine section.

The support portion may be connected to the base by means of a hinge. The extensible arm may be adapted to pivot the support portion about the hinge when moving the support portion between the transport position and the installation position. The hinge provides for a very simple mechanism for tilting the wind turbine component arranged on the installation apparatus. It offers good stability while requiring a minimum of one extensible arms for moving the support portion of the installation apparatus because the hinge only leaves one degree of freedom with respect to the movement of the support portion relative to the base of the installation apparatus.

The support portion may be further adapted to move relative to the base about a vertical axis of the installation apparatus. This embodiment of the invention offers an advantage in that aligning the component carried by the installation apparatus with another component is easier because of the added degree of freedom of movement. For the purpose of the invention it may be sufficient if the support portion is adapted to pivot by 45 degrees or less such that drill holes and bolts may be aligned precisely.

The support portion may also be adapted to move relative to the base along the transverse axis. As before, the additional degree of freedom may be used for alignment purposes while one wind turbine component is mounted to the other. It is sufficient if the support portion may move relative to the base by up to half a meter.

Movement along a roll axis of the installation apparatus as well as in the vertical direction is not necessary since the installation apparatus can be moved in that direction using a truck upon whose cargo area the installation apparatus will be loaded during operation. Such trucks usually comprise means for raising and lowering the cargo area.

The installation apparatus may further comprise first fixing means adapted to fix the base of the installation apparatus to transportation means, preferably to the cargo area of a truck. The installation apparatus may also comprise second fixing means adapted to fix the wind turbine component to the base of the installation apparatus.

A second aspect of the invention provides an assembly for handling a plurality of components of a wind turbine. The assembly includes an installation apparatus as set forth above and a hub support platform.

The hub support platform and the support platform serve for supporting one of the wind turbine components during installation. Their purpose will become more apparent when referring to the description of the drawings below.

The hub support platform may include a support platform base and a mounting section adapted to carry a hub of the wind turbine at an angle with respect to the support platform base. The slanted configuration is especially useful for positioning a hub relative to a nacelle of a wind turbine because commonly a plane of rotation of the wind turbine rotor and hence an orientation of the hub faces slightly upwards in the completed wind turbine.

The assembly may further comprise at least one support platform. The support platform comprises a platform section and at least two legs and is adapted to carry one of the components of the wind turbine. The at least two legs are arranged at opposite ends of the platform section and adapted to hold the platform section at a distance from a ground. The support platform may be used for carrying a component of the wind turbine and for arranging it at a desired height and orientation.

A second aspect of the invention refers to the use of the installation apparatus of the invention for handling a component of a wind turbine, e.g. a generator or a hub, especially during mounting of the component to another component of the wind turbine. The installation apparatus may be used for tilting one component in order to move it into the required position relative to the other component resting on the ground or on any suitable support means. The tilted component can then be mounted to the other component.

A further aspect of the invention relates to a method of mounting a wind turbine using an assembly according to the invention. The method comprises steps of:

transporting a nacelle to an installation site;
transporting a generator to the installation site;
mounting the generator to an installation apparatus while the installation apparatus is in the transport position;
setting the installation apparatus to the installation position;
mounting the generator to the nacelle while the installation apparatus is in the installation position;
releasing the generator from the installation apparatus;
transporting a hub to the installation site;
mounting the hub to the installation apparatus while the installation apparatus is in the transport position;
setting the installation apparatus to the installation position;
mounting the hub onto a hub support platform while the installation apparatus is in the installation position;
releasing the hub from the installation apparatus;
moving the hub support platform with the hub to the generator;
mounting the hub to the generator; and
releasing the hub support platform from the hub.

The method of the invention provides for a simple way of mounting a wind turbine section including a nacelle, a generator, and a hub. The wind turbine section may then be hoisted to the top of a wind turbine tower at the site where the wind turbine is to be erected. After this the rotor blades may be attached to the hub thus completing the installation of the wind turbine. The wind turbine section may be assembled at an installation site and then be transported by ship or truck to the wind park where the wind turbine is to be installed. It is an advantage of the method of the invention that no crane is required for assembling the wind turbine section.

The generator may be mounted to the nacelle before the hub is mounted to the generator. Alternatively the hub may be mounted to the generator before the generator is mounted to the nacelle. The order of the steps of the method may be changed accordingly.

The method may further include transporting the nacelle with the generator and the hub mounted thereto to a wind park and mounting the nacelle with the generator and the hub on a wind turbine tower located in the wind park.

The method may further comprise placing the nacelle on a support platform prior to mounting the generator to the nacelle. The support platform can be used to carry the nacelle or the generator at a defined height while the generator is brought to the installation site and aligned with the nacelle for mounting.

Preferably the installation apparatus is mounted on the cargo area of a truck. Furthermore, the installation apparatus may be detached from the cargo area for reuse (on the same or another truck) or storage.

BRIEF DESCRIPTION OF THE DRAWINGS

The invention will now be described and further illustrated referring to figures showing preferred embodiments of the invention. Like reference numerals designate the same or similar items throughout the figures.

DETAILED DESCRIPTION

Figure 1:
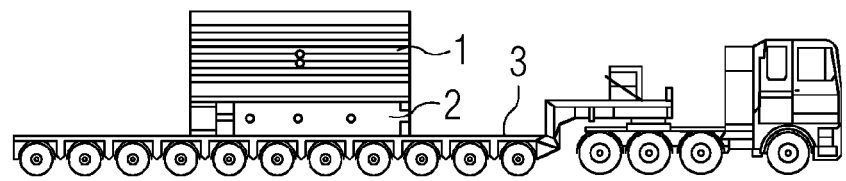
FIGS. 1 through 23 show the stages of an embodiment of the method of the invention.
Figure 2:
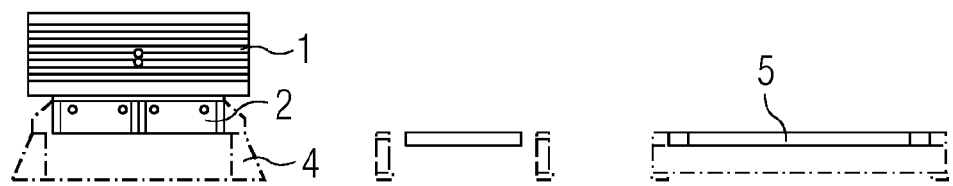
Figure 3:
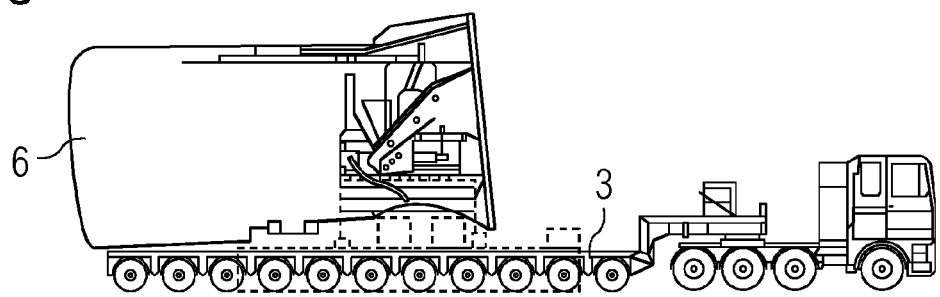

In FIG. 1 a generator 1 mounted on a generator transport frame 2 is transported to the installation site on the cargo area of a truck 3. The generator 1 together with the generator transport frame 2 is then placed on a support platform 4 (FIG. 2). An installation apparatus 5 is prepared for usage. In FIG. 3 a nacelle 6 is delivered to the installation site. The nacelle 6 may be transported on a suitable frame and/or may be placed on a corresponding support platform. Furthermore, the nacelle 6 may be delivered before or after the generator 1.

Figure 4:
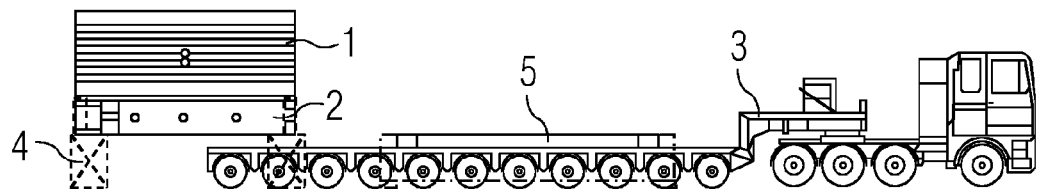
Figure 5:
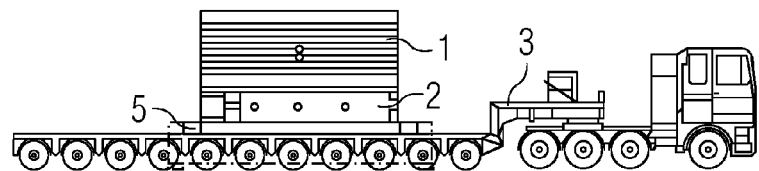
Figure 6:
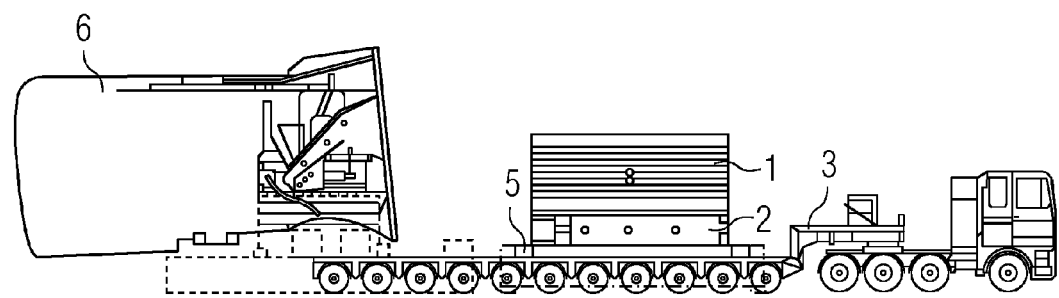

The installation apparatus 5 is placed on the cargo area of the truck 3. The truck 3 is used to move the installation apparatus 5 under the generator 1 on the support platform 4 (FIG. 4). The generator is then mounted on the installation apparatus 5 on the truck 3 and the support platform 4 is removed (FIG. 5). In FIG. 6 the generator 1 is moved to the nacelle 6 using the truck 3. For this purpose it may be useful to place the nacelle 6 on a corresponding support platform so that the truck 3 can partly move underneath the nacelle 6.

Figure 7:
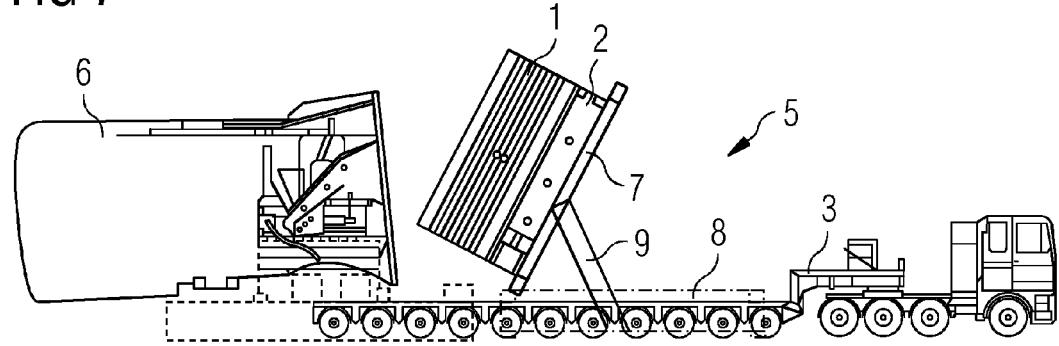
Figure 8:
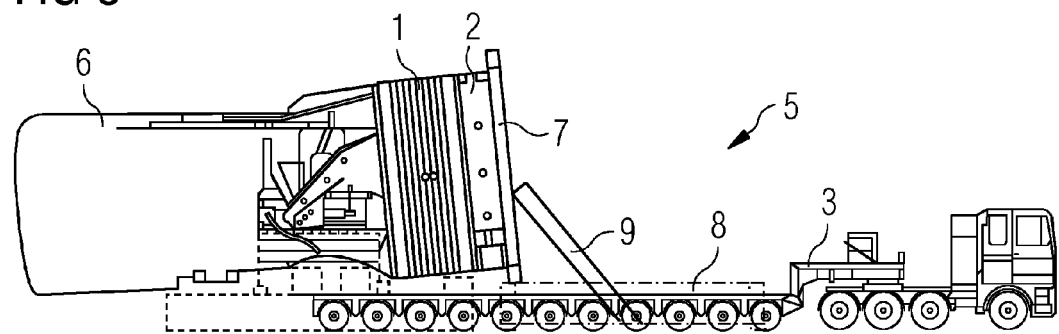
Figure 9:
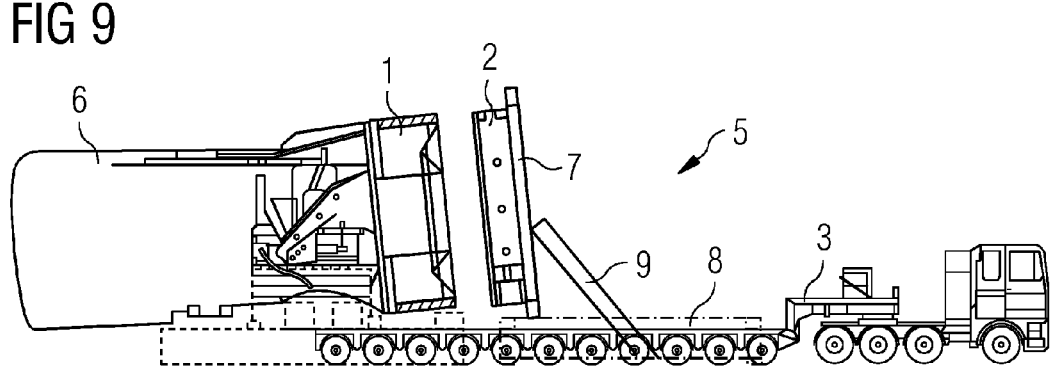

In FIG. 7 the installation apparatus 5 is used for tilting the generator 1 so that the side of the generator 1 facing the nacelle 6 may be mounted to the nacelle 6. The installation apparatus comprises a support portion 7 which moves the generator 1 and a base 8 which rests on the truck 3. An extensible arm 9 lifts and moves the support portion 7. In FIG. 8 the generator 1 is mounted to the nacelle. Afterwards, as shown in FIG. 9, the generator transport frame 2 is loosened from the generator 1 and the truck 3 can transport the installation apparatus 5 and optionally the generator transport frame 2 to a storage facility.

Figure 10:
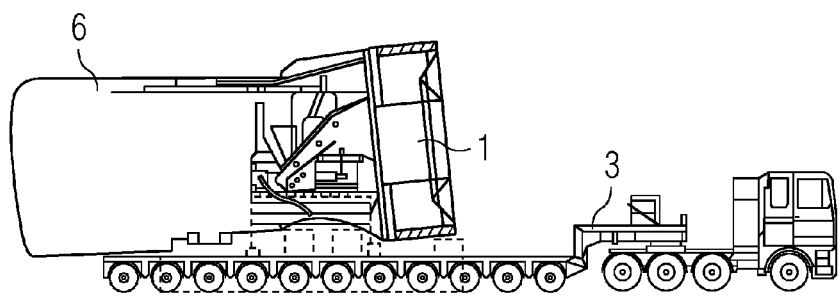
Figure 11:
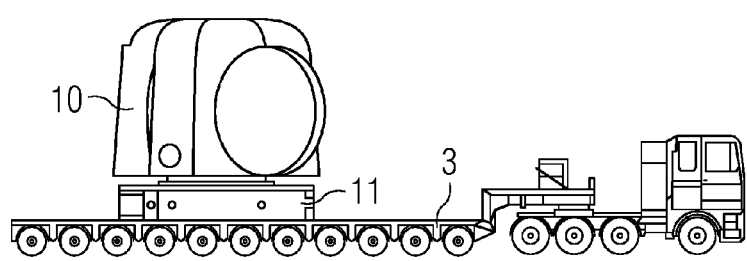
Figure 12:
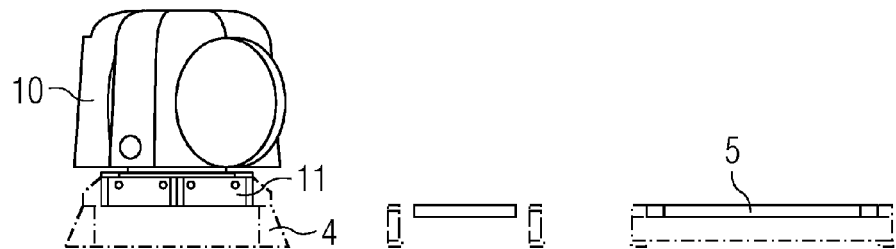

The further processing may be carried out at the same place or the nacelle 6 together with the generator 1 mounted thereto may be transported to a different place (FIG. 10). Subsequently or at an earlier point in time a hub 10 arranged on a hub transport frame 11 is transported to the installation site (FIG. 11) and placed on a support platform 4 (FIG. 12). The support platform 4 may be the same or a different one as that used in FIG. 2. Furthermore, the installation apparatus 5 in whose proximity the hub 10 will be placed may be the same as that used for handling the generator 1 or it may be one that is specifically adapted for weight, form and dimensions of the hub 10.

Figure 13:
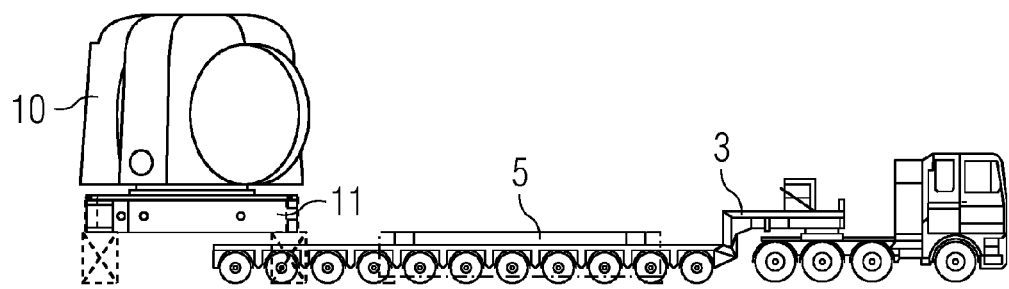
Figure 14:
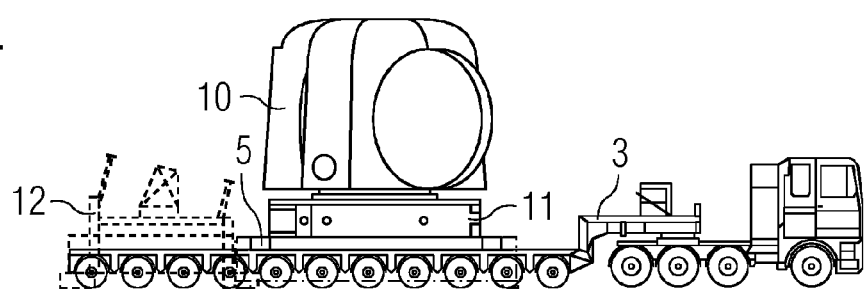
Figure 15:
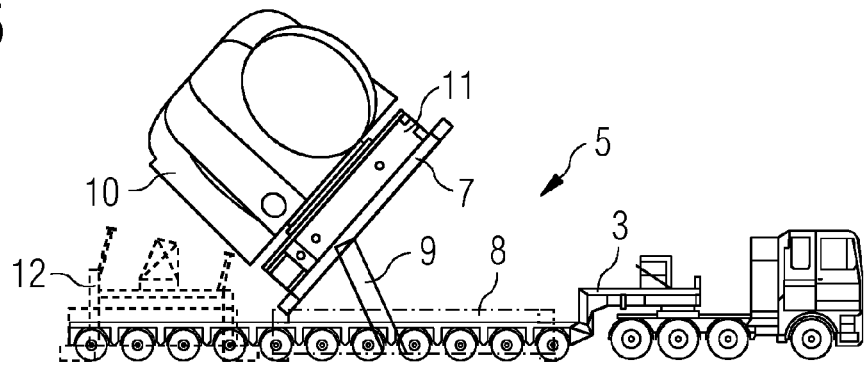
Figure 16:
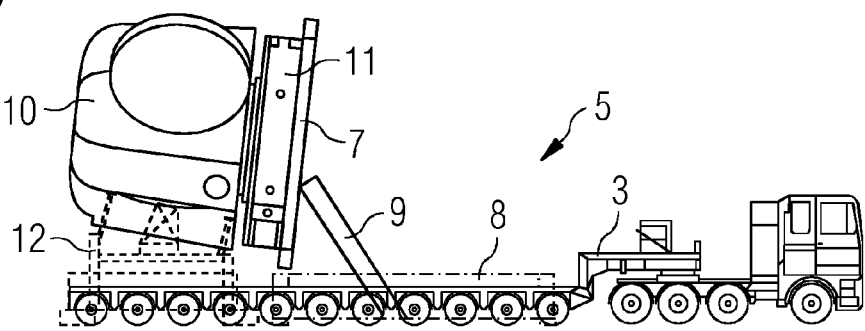
Figure 17:
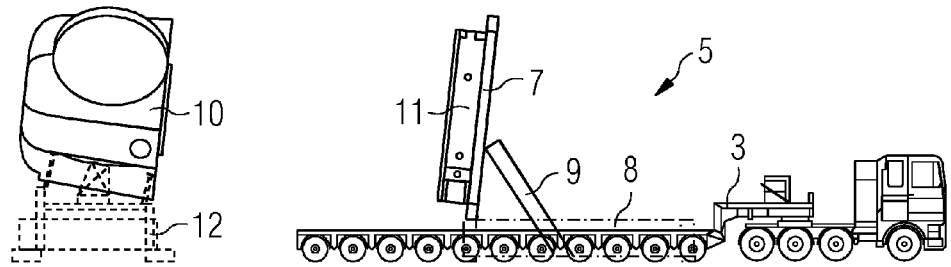

The installation apparatus 5 will be placed on the cargo area of a truck 3 and then moved under the hub 10 (FIG. 13). As shown in FIG. 14, the hub 10 is brought to a hub support platform 12 which carries the hub 10 until it is mounted to the generator 1. The installation apparatus 5 is then used to tilt the hub 10 (FIG. 15) and thus place it on the hub support platform 12 (FIG. 16). When the hub 10 is placed on the hub support platform 12, it will be connected to the hub support platform 12. Subsequently the hub transport frame 11 will be detached from the hub 10 and the truck 3 can remove the hub transport frame 11 and the installation apparatus 5 from the site (FIG. 17).

Figure 18:
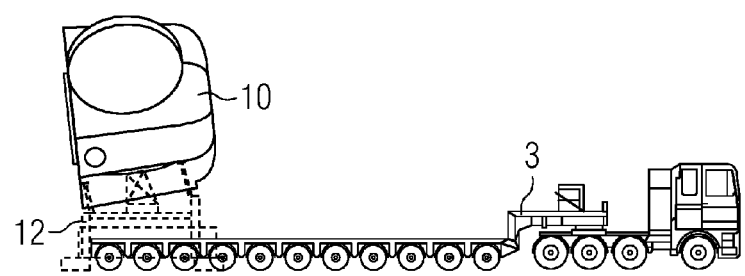

In FIG. 18 the hub 10 on the hub support platform 12 is loaded on the truck 3. For this purpose it is useful if the hub support platform 12 is constructed such that the cargo area of the truck 3 can at least partly move underneath it.

Figure 19:
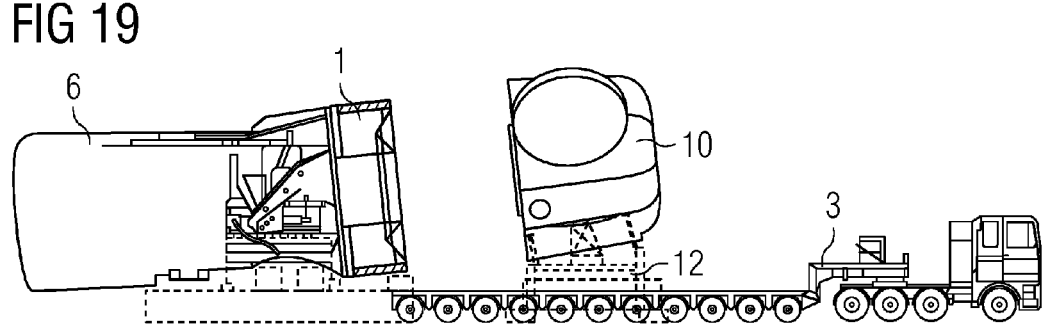
Figure 20:
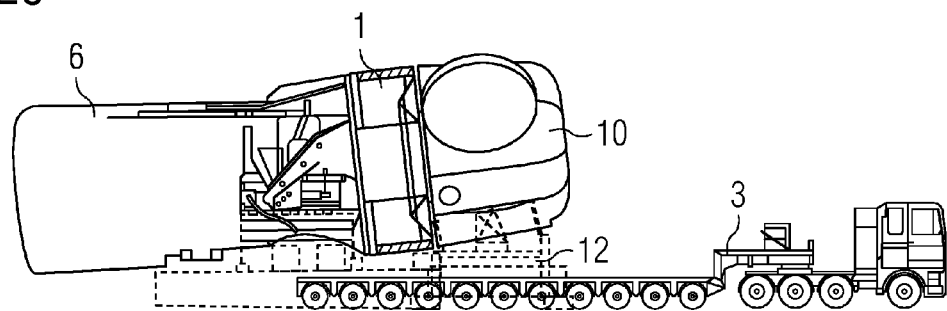

FIG. 19 shows how the hub 10 is transported to the nacelle 6 with the generator 1 already in place. It should be clear to the skilled person that it is equally possible to first mount the generator to the hub and then connect the hub with the generator to the nacelle. Such variants form part of the invention. In FIG. 20 the hub is mounted to the generator 1 thus completing the section of the wind turbine.

A complete wind turbine may constructed by erecting a wind turbine tower, assembling the section of the wind turbine as explained herein, hoisting the section to the top of the wind turbine tower and attaching rotor blades to the hub of the section of the wind turbine.

Figure 21:
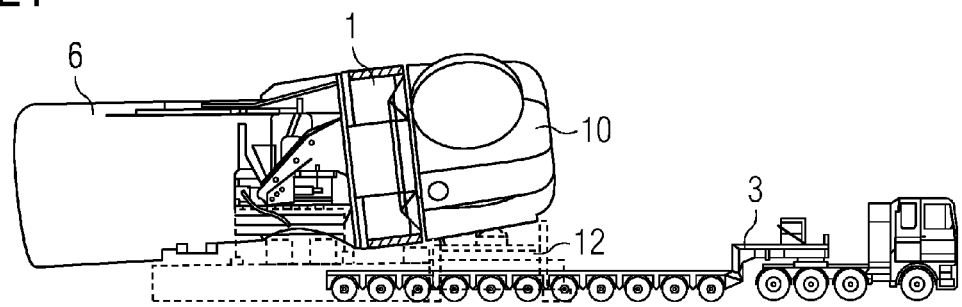
Figure 22:
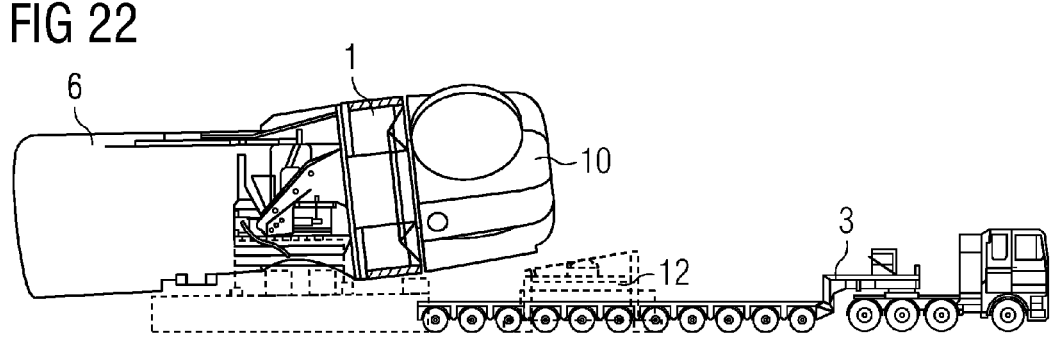
Figure 23:
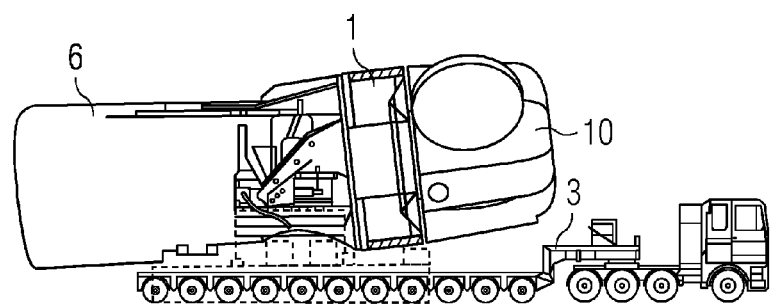

In FIG. 21 the hub support platform 12 is disconnected from the hub. This may include taking down support arms of the hub support platform 12. The hub support platform 12 is then removed (FIG. 22). The completed section of the wind turbine may then be transported to the wind turbine tower for installation using a truck (FIG. 23), a ship or other suitable transportation means.

The method of the invention as illustrated in the FIGS. 1 through 23 provides an advantage in that a section of the wind turbine may be assembled without requiring cranes and other expensive gear. Since the wind turbine section may be transported in several parts and may be assembled at remote locations, wind turbines may be erected at places that previously could not be supplied.

Even though the invention has been described referring to illustrative embodiments, the invention is not limited to the described exemplary embodiments. A person skilled in the art will be able to derive variations without leaving the scope of the invention as defined by the appendant claims.

We claim:
1. An assembly for handling a plurality of components of a wind turbine, the assembly comprising:
an installation apparatus for handling a first component of a wind turbine during an installation of the first component to a second component of the wind turbine, the installation apparatus, comprising:
a base,
a support portion, and
an extensible arm having opposing ends connected to the support portion and the base, respectively,
wherein the first component is a nacelle mounted to a generator and the second component is a hub;
a hub support platform, comprising,
a support platform base, and
a mounting section upon which the hub rests, the mounting section adapted to carry the hub of the wind turbine at an angle with respect to the support platform base; and
a truck comprising a cargo area,
wherein the extensible arm is adapted to move the support portion relative to the base and about a transverse axis of the installation apparatus between a transport position in which the support portion rests on the base and an installation position in which the support portion and the base form an angle,
wherein the extendable arm is adapted to move the support portion relative to the base from the transport position to the installation position on the cargo area of the truck,
wherein the support platform base of the hub support platform rests on the cargo area of the truck while carrying the hub of the wind turbine,
wherein the support platform base is adapted to move relative to the truck, and
wherein the first component is mounted to the second component on the cargo area of the truck.
2. The installation apparatus as claimed in claim 1, wherein the support portion is connected to the base by means of a hinge, and
wherein the extensible arm is adapted to pivot the support portion about the hinge when moving the support portion between the transport position and the installation position.
3. The installation apparatus of claim 1, wherein the support portion is further adapted to move relative to the base about a vertical axis of the installation apparatus.
4. The installation apparatus of claim 1, wherein the support portion is further adapted to move relative to the base along the transverse axis.

* * * * *